(12) United States Patent
Lee et al.

(10) Patent No.: US 11,605,325 B2
(45) Date of Patent: Mar. 14, 2023

(54) DISPLAY DEVICE AND METHOD OF OPERATING THE SAME

(71) Applicant: SAMSUNG ELECTRONICS CO., LTD., Suwon-si (KR)

(72) Inventors: Wonjun Lee, Suwon-si (KR); Kyusub Kwak, Suwon-si (KR); Jeongbong Bae, Hwaseong-si (KR); Janghoon Yoo, Hwaseong-si (KR); Jeonggeun Yun, Suwon-si (KR); Kyookeun Lee, Suwon-si (KR); Sangchul Jung, Hwaseong-si (KR); Myongjo Choi, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 17/064,935

(22) Filed: Oct. 7, 2020

(65) Prior Publication Data

US 2021/0104188 A1   Apr. 8, 2021

(30) Foreign Application Priority Data

Oct. 7, 2019 (KR) .................. 10-2019-0123960

(51) Int. Cl.
*G09G 3/02* (2006.01)
*G02B 26/10* (2006.01)
*G02B 27/10* (2006.01)

(52) U.S. Cl.
CPC ............ *G09G 3/025* (2013.01); *G02B 26/10* (2013.01); *G02B 27/1006* (2013.01); *G09G 2320/02* (2013.01)

(58) Field of Classification Search
CPC ...... G09G 3/02; G09G 3/025; G09G 2320/02; G02B 26/10; G02B 26/101; G02B 26/105; G02B 27/104; G02B 27/1006; G02B 27/0172; H04N 9/3129; H04N 9/3161; H04N 9/3164

See application file for complete search history.

(56) References Cited

U.S. PATENT DOCUMENTS

| 8,036,533 B2 | 10/2011 | Hosomi et al. |
| 8,917,223 B2 | 12/2014 | Isobe |
| 9,549,145 B2 * | 1/2017 | Heinzelmann ....... G02B 26/123 |

(Continued)

FOREIGN PATENT DOCUMENTS

| CN | 109449146 A | 3/2019 |
| JP | 7-225360 A | 8/1995 |

(Continued)

*Primary Examiner* — Xuemei Zheng
(74) *Attorney, Agent, or Firm* — Sughrue Mion, PLLC

(57) ABSTRACT

A display device includes a first light source configured to emit first pixel light in each of which lights of a plurality of different wavelengths are mixed with one another, a second light source configured to emit a plurality of second pixel lights in each of which lights of a plurality of different wavelengths are mixed with one another, and an optical scanner configured to output an image including the plurality of first pixel lights and the plurality of second pixel lights to an external space by sequentially changing travelling paths of the plurality of first pixel lights and the plurality of second pixel lights.

17 Claims, 17 Drawing Sheets

(56) References Cited

U.S. PATENT DOCUMENTS

| | | | | |
|---|---|---|---|---|
| 11,131,796 | B2* | 9/2021 | Bartlett | G02B 6/0035 |
| 2012/0013852 | A1* | 1/2012 | Champion | H04N 9/3129 |
| | | | | 359/204.3 |
| 2013/0076800 | A1* | 3/2013 | Hatagi | G02B 27/104 |
| | | | | 353/31 |
| 2019/0174092 | A1 | 6/2019 | Adler et al. | |

FOREIGN PATENT DOCUMENTS

| | | |
|---|---|---|
| JP | 2009-105106 A | 5/2009 |
| JP | 5790040 B2 | 10/2015 |
| WO | 2012/046656 A1 | 4/2012 |

* cited by examiner

DISPLAY DEVICE AND METHOD OF OPERATING THE SAME

CROSS-REFERENCE TO RELATED APPLICATION(S)

This application is based on and claims priority under 35 U.S.C. § 119 to Korean Patent Application No. 10-2019-0123960, filed on Oct. 7, 2019, in the Korean Intellectual Property Office, the disclosure of which is incorporated by reference herein in its entirety.

BACKGROUND

1. Field

The disclosure relates to a display device and a method of operating the display device, and more particularly, to a display device that is worn by a user and a method of operating the display device.

2. Description of Related Art

A wearable display device is a device with which a person is able to view a displayed screen while wearing the device. As research on wearable display devices has been actively conducted, various types of wearable devices have been released or are expected to be released.

Because such a wearable display device is intended to be worn by a person, lightness of weight and thinness are required in consideration of a user's use environment.

SUMMARY

Provided are a display device capable of reducing pixel size and outputting a high resolution image, and a method of operating the same.

Additional aspects will be set forth in part in the description which follows and, in part, will be apparent from the description, or may be learned by practice of the presented embodiments of the disclosure.

In accordance with an aspect of the disclosure, a display device may include a first light source configured to emit first pixel light in each of which light of a plurality of different wavelengths are mixed with one another, a second light source configured to emit a plurality of second pixel lights in each of which light of a plurality of different wavelengths are mixed with one another, and an optical scanner configured to output an image including the plurality of first pixel lights and the plurality of second pixel lights to an external space by sequentially changing travelling paths of the plurality of first pixel lights and the plurality of second pixel lights.

In addition, at least one of the first light source or the second light source may include a first sub light source configured to emit first light of a first wavelength, a second sub light source configured to emit second light of a second wavelength, a third sub light source configured to emit third light of a third wavelength, and a light mixing element configured to emit the first light, the second light, and the third light, respectively.

In addition, the light mixing element may mix the first light, the second light, and the third light by matching optical axes of the first light, the second light, and the third light.

In addition, the light mixing element may include at least one of a waveguide, a multiplexer, or a dichroic filter.

In addition, the first light, the second light, and the third light may be red light, green light, and blue light, respectively.

In addition, the optical scanner may form images adjacent to each other in the external space by changing travelling paths of the first and second pixel lights corresponding to each other among the plurality of first pixel lights and the plurality of second pixel lights.

In addition, the optical scanner may form an image such that such that the first and second pixel lights corresponding to each other do not overlap with each other.

Further, the first and second pixel lights corresponding to each other may be incident on the optical scanner at adjacent times among the plurality of first pixel lights and the plurality of second pixel lights.

Further, the first and second pixel lights corresponding to each other may be incident on the optical scanner at the same time among the plurality of first pixel lights and the plurality of second pixel lights.

In addition, the first light source and the second light source may alternately emit the plurality of first pixel lights and the plurality of second pixel lights one by one.

In addition, the plurality of first pixel lights and the plurality of second pixel lights may include different polarization characteristics.

In addition, the display device may further include an optical axis adjusting element configured to adjust an optical axis of at least one of the plurality of first pixel lights or the plurality of second pixel lights such that the plurality of first pixel lights and the plurality of second pixel lights are incident to be parallel on the optical scanner.

In addition, optical axes of the plurality of first pixel lights may not match with optical axes of the plurality of second pixel lights.

Also, the optical axis adjusting element may include a beam splitter.

Further, the beam splitter may include at least one of a polarizing beam splitter or a half mirror.

Further, the display device may further include a focus variable element configured to adjust focal lengths of the plurality of first pixel lights and the plurality of second pixel lights.

The display device may further include an expander configured to form an image on a pupil of a user.

Further, the display device may be a head mounted display device.

In accordance with an aspect of the disclosure, a method of operating a display device includes controlling a first light source to emit a plurality of first pixel lights in each of which light of a plurality of different wavelengths are mixed with one another, and a second light source to emit a plurality of second pixel lights in each of which light of a plurality of different wavelengths are mixed with one another, and controlling an optical scanner to output an image including the plurality of first pixel lights and the plurality of second pixel lights by changing travelling paths of the plurality of first pixel lights and the plurality of second pixel lights over time.

In addition, the controlling of the first light source and the second light source may include controlling the first light source and the second light source to emit the plurality of first pixel lights and the plurality of second pixel lights alternately.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, exemplary embodiments will be described in detail with reference to the accompanying drawings. The following examples are only intended to illustrate the technical content and not to limit the scope of rights. From the detailed description and embodiments, what can be easily inferred by experts in the relevant technical field is interpreted as belonging to the scope of rights.

As used herein, terms such as 'composed of' or 'comprises' should not be construed as including all of the various components, or various steps described in the specification, and it should be construed that some components or steps may not be included, or may further include additional components or steps. In addition, terms such as " . . . unit" and "module" described in the specification mean a unit that processes at least one function or operation, which may be implemented in hardware or software, or a combination of hardware and software.

Throughout the disclosure, the expression "at least one of a, b or c" indicates only a, only b, only c, both a and b, both a and c, both b and c, all of a, b, and c, or variations thereof.

Further, terms including an ordinal number such as "first" or "second" used in the specification may be used to describe various components, but the components should not be limited by the terms. The terms are used only for the purpose of distinguishing one component from other components.

Figure 1:
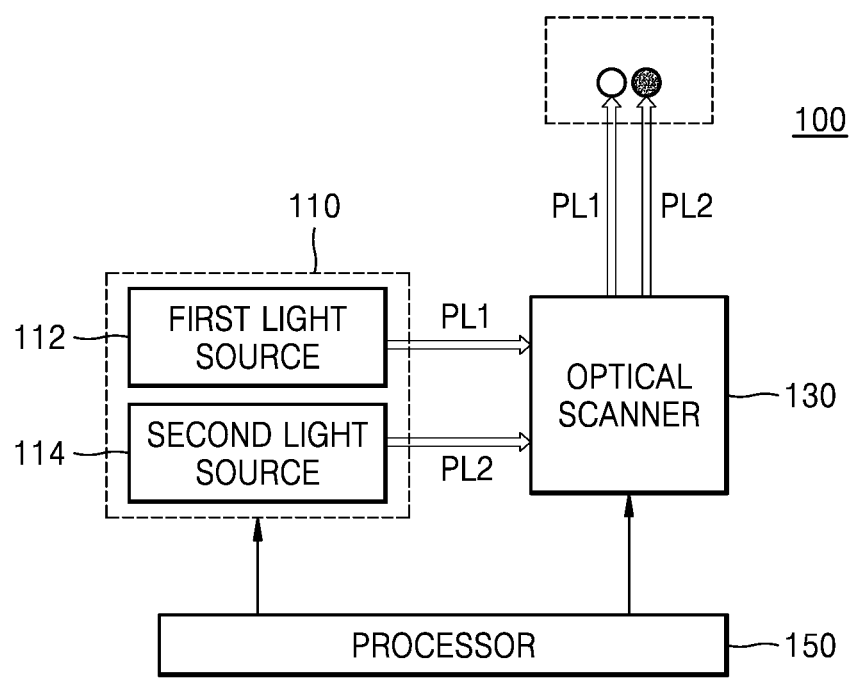
FIG. 1 is a block diagram illustrating an example of a display device according to an embodiment.

FIG. 1 is a block diagram illustrating an example of a display device 100 according to an embodiment. Referring to FIG. 1, the display device 100 may include a light source unit 110 configured to emit pixel light including a plurality of different wavelengths of light that are mixed, an optical scanner 130 configured to change travelling paths of pixel lights emitted from the light source unit 110, and a processor 150 configured to control the light source unit 110 and the optical scanner 130 to output an image including the pixel lights in an external space.

The light source unit 110 may include one or more light sources configured to emit pixel lights in which a plurality of different wavelengths of light are mixed. For example, the light source unit 110 may include a first light source 112 configured to emit first pixel lights PL1 in which a light of a plurality of different wavelengths are mixed, and a second light source 114 configured to emit second pixel lights PL2 in which a plurality of different wavelengths of light are mixed. The first light source 112 and the second light source 114 are separated in hardware and may operate independently under the control of the processor 150.

Each of the first light source 112 and the second light source 114 may include a plurality of sub-light sources emitting light of different wavelengths and a light mixing element mixing the light of different wavelengths.

The plurality of sub-light sources may include a first sub light source outputting light of a first wavelength, a second sub light source outputting light of a second wavelength different from the first wavelength, and a third sub light source outputting light of a third wavelength different from the first wavelength and the second wavelength. Light of the first wavelength, light of the second wavelength, and light of the third wavelength may be red light, green light, or blue light, respectively.

Each sub light source may include a light source 200 such as a laser diode (LD), an edge emitting laser, a vertical-cavity surface emitting laser (VCSEL), a distributed feedback laser, light emitting diode (LED), and a super luminescent diode (SLD). However, the disclosure is not limited thereto. Each of the sub light sources may emit pulsed light or continuous light.

A light mixing element may mix light of different wavelengths emitted from the first to third sub light sources so that the light of different wavelengths include the same optical axis. For example, the above-described light mixing element may include a waveguide, a beam splitter, a dichroic filter, and the like.

Figure 2A:
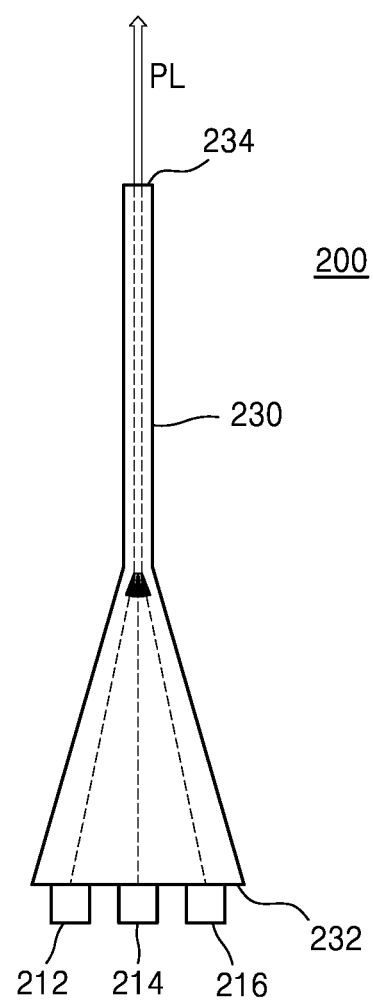
FIG. 2A is a diagram illustrating an example of a light source applicable to the light source unit of FIG. 1.

FIG. 2A is a diagram illustrating an example of a light source applicable to the light source unit 110 of FIG. 1. As shown in FIG. 2A, a light source 200 may include a first sub light source 212 configured to output light of a first wavelength, a second sub light source 214 configured to output light of a second wavelength different from the first wavelength, a third sub light source 216 configured to output light of a third wavelength different from the first wavelength and the second wavelength, and a light mixing element 230 configured to mix light of different wavelengths emitted from the first sub light source 212, the second sub light source 214, and the third sub light source 216.

In FIG. 2A, a waveguide is shown as the light mixing element 230. Output terminals of the first sub light source 212, the second sub light source 214 and the third sub light source 216 may be positioned on an input coupler 232 of the light mixing element 230. The light mixing element 230 may include a tapered region having a width that gradually decreases from the input coupler 232 toward an output coupler 234.

The light emitted from the output terminals of the first sub light source 212, the second sub light source 214, and the third sub light source 216 are mixed with one another while proceeding in the light mixing element 230 so that the optical axes for the light of the first to third wavelengths may match one another. Thus, the mixed light, that is, the pixel light, may be emitted from the output coupler 234 of the light mixing element 230. The light mixing element 230 may further include a planar light circuit (PLC).

Figure 2B:
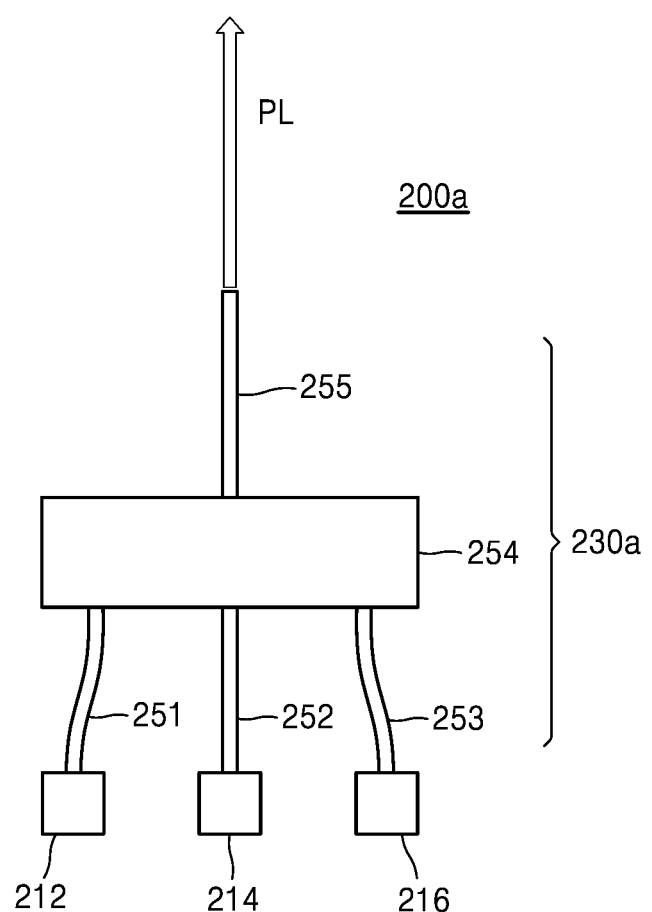
FIG. 2B is a diagram illustrating another example of a light source applicable to the light source unit of FIG. 1.

FIG. 2B is a diagram illustrating another example of a light source 200a applicable to the light source unit 110 of FIG. 1. As shown in FIG. 2B, a light mixing element 230a may include a plurality of optical fibers including a first optical fiber 251, a second optical fiber 252, a third optical fiber 253, and a fourth optical fiber 255, which are a type of waveguide, and a multiplexer 254. Each of ends of the first optical fiber 251, the second optical fiber 252, and the third optical fiber 253 may be connected to the output terminals of the first sub light source 212, the second sub light source 214, and the third sub light source 216, and each of the other ends of the first optical fiber 251, the second optical fiber 252, and the third optical fiber 253 may be connected to an input terminal of the multiplexer 254. Further, the fourth optical fiber 255 may be connected to the output terminal of the multiplexer 254.

Each of the first optical fiber 251, the second optical fiber 252, and the third optical fiber 253 may transmit to the multiplexer 254 first light, second light, and third light respectively emitted from the output terminals of the first sub light source 212, the second sub light source 214, and the third sub light source 216, and the multiplexer 254 may mix the first light, the second light, and the third light to output the mixed light including the same optical axis. The mixed light may be emitted outside through the fourth optical fiber 255. Depending on the embodiment, the fourth optical fiber 255 may not be necessary.

Figure 2C:
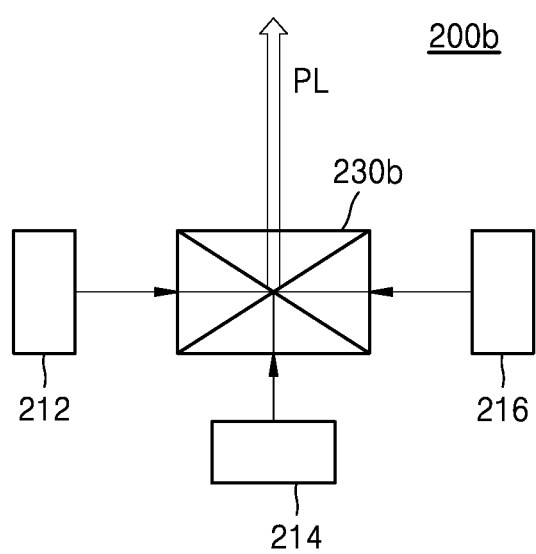
FIG. 2C is a diagram illustrating an example of a light source including a dichroic filter, according to an embodiment.

FIG. 2C is a diagram illustrating an example of a light source 200b including a dichroic filter 230b according to an embodiment. As shown in FIG. 2C, the light source 200b is a light mixing element, and may include a dichroic filter 230b configured to transmit light of a specific wavelength and reflect light of the remaining wavelengths. The dichroic filter 230b may include a plurality of film layers and a plurality of lens layers. For example, the dichroic filter 230b may be designed to transmit light of a first wavelength and reflect light of the remaining wavelengths, that is, light of a second wavelength and of a third wavelength. Thus, when light of the first wavelength, the second wavelength, and the third wavelength are incident on a specific point of the dichroic filter 230b, the light of the first wavelength is transmitted and the light of the second wavelength and the third wavelength are reflected, at the specific point, and thus the light of the first wavelength, the second wavelength, and the third wavelength are mixed with one another. Then, mixed light including the same optical axis may be emitted from the dichroic filter 230b.

As described above, because the light source 200, the light source 200a, and the light source 200b emit the mixed light including the same optical axis, as pixel light, pixel light having a quantity less than the pixel light including the first light, the second light, and the third light including different optical axes may be output.

Referring back to FIG. 1, the optical scanner 130 may output an image to an external space by sequentially changing over time the travelling paths of the pixel light PL1 and the pixel light PL2 emitted from the light source unit 110. The optical scanner 130 may sequentially change the travelling paths of the pixel lights PL1 and PL2 so that the pixel light PL1 and the pixel light PL2 form an image at different locations in the external space to realize a frame image. That is, the optical scanner 130 may focus pixel lights incident at different times during one scan period in different spaces. The optical scanner 130 may change the travelling paths of the pixel lights PL1 and the pixel lights PL2 while rotating mechanically, or may change the travelling paths of the pixel lights PL1 and the pixel lights PL2 according to an electrical signal.

Figure 3A:
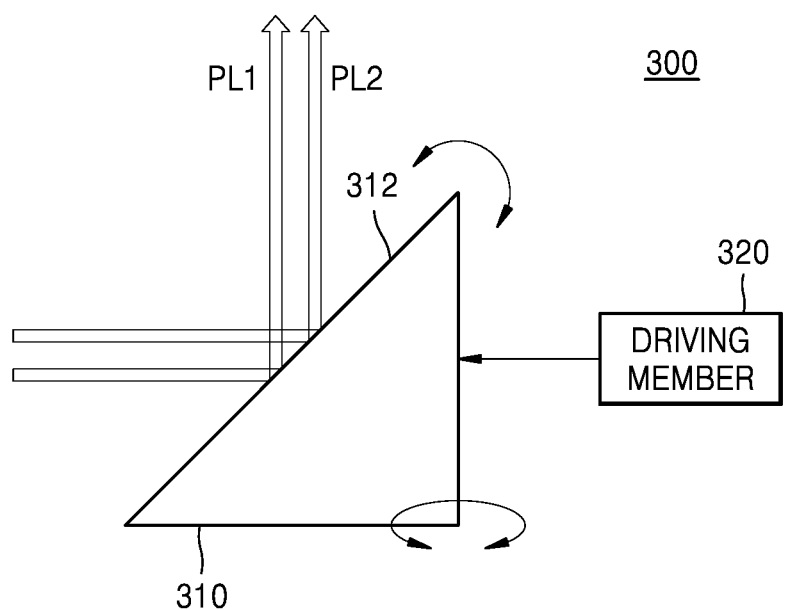
FIG. 3A is a diagram illustrating an example of an optical scanner based on mechanical movement, according to an embodiment.

FIG. 3A is a diagram illustrating an example of an optical scanner 300 based on mechanical movement according to an embodiment. As shown in FIG. 3A, the optical scanner 300 may include an optical element 310 having a reflection surface 312 configured to reflect incident pixel lights PL1 and pixel lights PL2, and a driving element 320 configured to rotate the reflection surface 312 mechanically such that the reflected directions of the pixel lights PL1 and the pixel lights PL2 are changed. Depending on the rotation angle of the reflection surface 312, the reflection directions of the incident pixel lights PL1 and the incident pixel lights PL2 may be sequentially adjusted. The rotation of the reflection surface 312 described above may be continuous or discontinuous.

The rotation of the reflection surface 312 is illustrated as uniaxial rotation, but is not limited thereto. It is also possible for the reflection surface 312 to be biaxially rotated, that is, rotationally driven about two rotational axes. Alternatively, the optical scanner 300 may reflect the pixel lights PL1 and the pixel lights PL2 not only with rotation driving but also with swing driving. In addition, the optical scanner 300 is illustrated as including one reflection surface 312, but this is exemplary, and it is also possible that a plurality of reflection surfaces are arranged and their respective directions are adjusted.

Figure 3B:
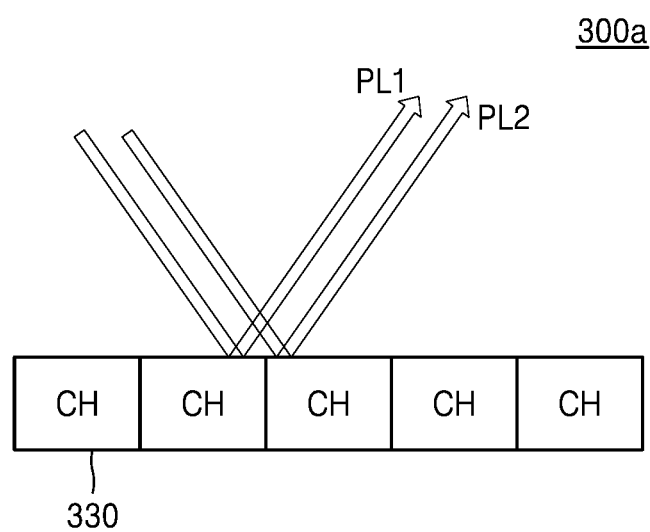
FIG. 3B is a diagram illustrating an example of an optical scanner based on phase modulation, according to an embodiment.

FIG. 3B is a diagram illustrating an example of an optical scanner 300a based on phase modulation according to an embodiment. As shown in FIG. 3B, the optical scanner 300a may include a plurality of channels (CH) 330. The phase change value for changing the phase of the pixel lights PL1 and the pixel lights PL2 in each of the plurality of channels (CH) may be set, and accordingly, the direction in which the pixel lights PL1 and the pixel lights PL2 are emitted may be adjusted.

Each of the plurality of channels (CH) of the optical scanner 300b may include a meta device including a shape dimension of a sub wavelength in which the phase change values for the pixel lights PL1 and the pixel lights PL2 may be electrically controlled. Alternatively, the optical scanner 300b may be a silicon photonics-based waveguide that branches the paths of the pixel lights PL1 and the pixel lights PL2 into a plurality of paths to be directed toward each output terminal (the plurality of channels). The waveguide may include a phase retarder provided in each of the plurality of branched paths, and adjust the length of each path and/or the degree of phase delay in the phase retarder of each path so that the exit directions of the pixel lights PL1 and the pixel lights PL2 are adjusted. The optical scanner 300b steers the lights in the direction determined by the combination of phase changes occurring in each channel for the pixel lights PL1 and the pixel lights PL2.

Figure 4:
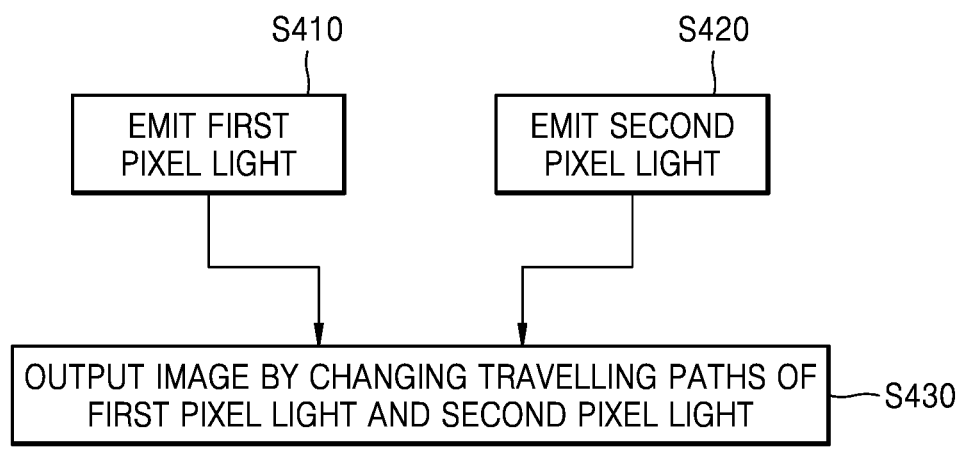
FIG. 4 is a flowchart illustrating a method in which a display device outputs an image, according to an embodiment.

FIG. 4 is a flowchart illustrating a method in which a display device 100 outputs an image according to an embodiment.

A first light source 112 may emit first pixel lights PL1 at operation S410, and a second light source 114 may emit second pixel lights PL2 at operation S420. The processor 150 may classify an image signal corresponding to a frame image into a first image signal and a second image signal. Each of the first image signal and the second image signal may include a plurality of first pixel signals and second pixel signals, and the pixel signals may correspond to pixels in the frame image. That is, one pixel of the frame image is formed corresponding to one pixel signal.

The processor 150 may apply the first image signal to the first light source 112 and the second image signal to the second light source 114. Then, the first light source 112 may emit first pixel lights PL1 over time in response to the first image signal, and second light source 114 may emit second pixel lights PL2 over time in response to the second image signal. The first pixel lights PL1 and the second pixel lights PL2 may be sequentially emitted one by one over time.

On the other hand, when the processor 150 applies the first image signal and the second image signal to the first light source 112 and the second light source 114, the first pixel signal and the second pixel signal included in the first image signal and the second image signal may be applied alternately to the first light source 112 and the second light source 114 one by one. Then, the first light source 112 and the second light source 114 may alternately emit the first pixel light PL1 and the second pixel light PL2 corresponding to the first pixel signal and second pixel signal. However, it is not limited to this. The processor 150 may simultaneously apply the first pixel signal and the second pixel signal to the first light source 112 and the second light source 114, and the first light source 112 and the second light source 114 may simultaneously emit first pixel light and second pixel light corresponding to the first pixel light PL1 and the second pixel light PL2.

The first light source 112 and the second light source 114 may be spatially separated and arranged such that the first pixel light PL1 and the second pixel light PL2 form an image on the external space without overlapping with the first pixel light PL1 and the second pixel light PL2. For example, the first light source 112 and the second light source 114 may not overlap with the travelling path of the first pixel light PL1 and the travelling path of the second pixel light PL2. Alternatively, an arbitrary optical element may be positioned on the travelling paths of the first pixel light PL1 and the second pixel light PL2 so that the first pixel light PL1 and the second pixel light PL2 form an image in different areas.

The optical scanner 130 may output an image to an external space by changing the travelling paths of the first pixel light PL1 and the second pixel light PL2 at operation S430. The processor 150 may control the optical scanner 130 such that the travelling paths of the incident pixel light PL1 and the incident pixel light PL2 change with time. In controlling the optical scanner 130, the processor 150 may control the horizontal scan of the optical scanner 130 such that first pixel light PL1 and second pixel light PL2 corresponding to the first pixel light PL1 sequentially form an image in the horizontal direction and a row image is output, and may control the horizontal scan of the optical scanner 130 such that, when the output of the row image is completed, the output direction of the optical scanner 130 is vertically moved and then the next row image is output. The scan of the optical scanner 130 can be referred to as a two-dimensional scan.

Figure 5A:
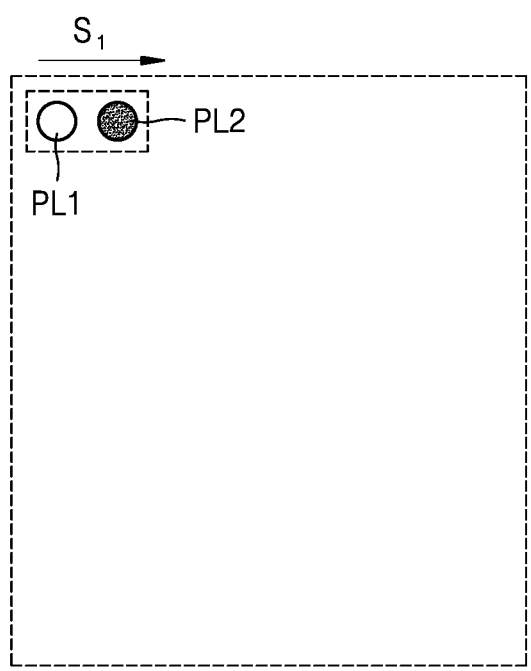
FIG. 5A is a reference diagram illustrating a method in which an optical scanner outputs an image, according to an embodiment.
Figure 5B:
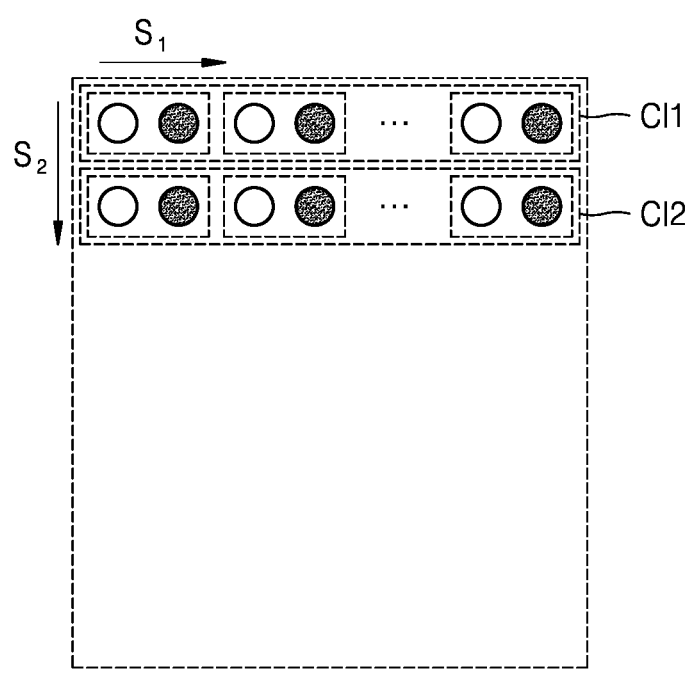
FIG. 5B is a reference diagram illustrating a method in which an optical scanner outputs an image, according to an embodiment.
Figure 5C:
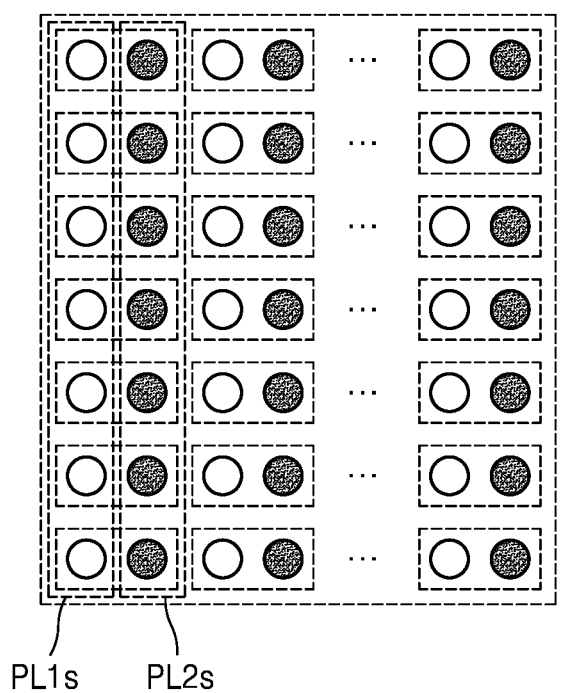
FIG. 5C is a reference diagram illustrating a method in which an optical scanner outputs an image, according to an embodiment.

FIGS. 5A to 5C are reference diagrams illustrating a method in which the optical scanner 130 outputs an image according to an embodiment. When the reflection surface 312 of the optical scanner 130 is at a specific position, corresponding first pixel light PL1 and second pixel light PL2 may be incident on the optical scanner 130. The corresponding first pixel light PL1 and second pixel light PL2 may mean first pixel light PL1 and second pixel light PL2 which are incident on the optical scanner 130 at an adjacent time among the first pixel light PL1 and the second pixel light PL2. For example, the corresponding first pixel light PL1 and second pixel light PL2 may be first pixel light PL1 and second pixel light PL2 which are incident on the optical scanner 130 at the same time. Or when the first pixel light PL1 and the second pixel light PL2 are alternately incident, the incident first pixel light PL1 and the second pixel light PL2 incident after the first pixel light PL1 can also be called first pixel light PL1 and second pixel light PL2.

The corresponding first and second pixel lights PL1 PL2 may be incident on the optical scanner 130 without overlapping each other. The optical scanner 130 may change the travelling paths of the corresponding first and second pixel lights PL1 and PL2 to focus the first pixel light PL1 and the second pixel light PL2 corresponding to an external space.

As illustrated in FIG. 5A, the optical scanner 130 may focus the corresponding first and second pixel lights PL2 adjacently in the external space. Here, focusing adjacently may mean that other pixel lights are not focused between the first pixel light PL1 and the second pixel light PL2. Under the control of the processor 150, the optical scanner 130 may horizontally focus other corresponding first and second pixel lights PL1 and PL2 through horizontal scan S1. The first pixel light PL1 and the second pixel light PL2 which are focused in the horizontal direction may be a first row image Cl1.

As described above, because each pixel of the image is caused by mixed light, the pixel size can be reduced compared to a pixel due to lights focused on different regions for each wavelength. Also, because two light sources are used, the spatial resolution of the image may be greater than outputting the image using one light source.

When the horizontal scan S1 of the optical scanner 130 is completed, the output direction of the optical scanner 130 may be vertically moved, in a direction S2, under the control of the processor 150 to output the next row image. Further, as shown in FIG. 5B, the optical scanner 130 may output a second row image Cl2 based on the first pixel light PL1 and the second pixel light PL2 through the horizontal scan S1. In the same manner as described above, the optical scanner 130 may perform a two-dimensional scan.

During one scan period, the optical scanner 130 may output a frame image as shown in FIG. 5C. The frame image may be formed by the first pixel lights PL1s and the second pixel lights PL2s. For example, pixels arranged in odd-numbered columns of the frame image may be formed by focusing the first pixel lights PL1s, and pixels arranged in even-numbered columns may be formed by focusing the second pixel lights PL2s.

In FIGS. 5A to 5C, it is illustrated that the corresponding first and second pixel lights form the same row image, but is not limited thereto. The corresponding first and second pixel lights may form the same row image. Thus, the pixels arranged in the odd-numbered columns of the frame image may be formed by focusing the first pixel lights PL1s, and the pixels arranged in the even-numbered columns may be formed by focusing the second pixel lights PL2s.

In the display device 100 illustrated in FIG. 1, only components related to the embodiments of the disclosure are illustrated. Therefore, it is apparent to those skilled in the art that the display device 100 may further include other general-purpose components in addition to the components shown in FIG. 1. For example, the display device 100 may further include memory.

The memory is hardware that stores various data processed in the display device 100. For example, the memory may store processed data and data to be processed in the display device 100. Also, the memory may store applications, drivers, and the like to be driven by the display device 100.

The memory includes random access memory (RAM) such as dynamic random access memory (DRAM), static random access memory (SRAM) and the like, read-only memory (ROM), electrically erasable programmable read-only memory (EEPROM), CD-ROM, Blu-ray or other optical disk storage, hard disk drive (HDD), solid state drive (SSD), or flash memory, and may further include other external storage devices that can be accessed to the display device 100.

Figure 6:
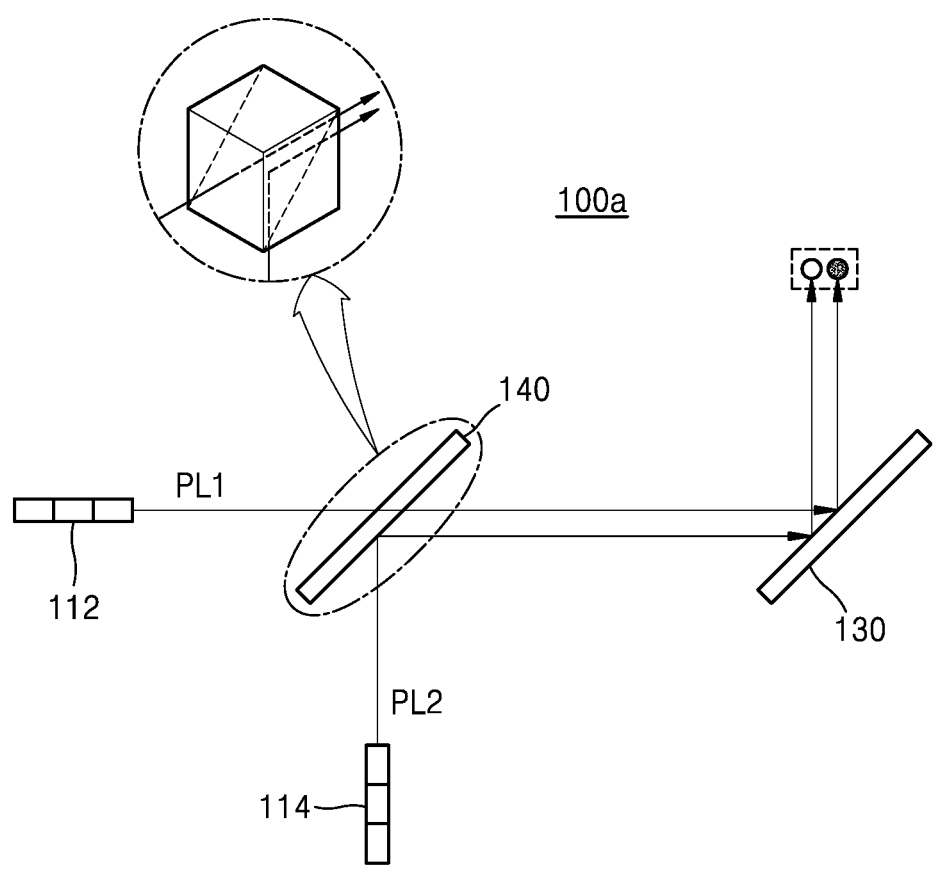
FIG. 6 is a diagram illustrating an example of a display device including an optical axis adjusting element, according to an embodiment.

FIG. 6 is a diagram illustrating an example of a display device 100a including an optical axis adjusting element 140 according to an embodiment. Comparing FIG. 1 with FIG. 6, the display device 100a of FIG. 6 may further include an optical axis adjusting element 140 configured to adjust an optical axis of at least one of first pixel lights PL1 or second pixel lights PL2. For example, the optical axis adjusting element 140 may transmit first pixels emitted from a first light source 112 and reflect second pixel lights PL2 emitted from a second light source 114, so that the optical axes of the first pixel light PL1 and the second pixel light PL2 emitted from the optical axis adjusting element 140 may be parallel to each other.

In addition, the optical axis adjusting element 140 may emit the first pixel light PL1 and the second pixel light PL2 without overlapping each other. For example, in the optical axis adjusting element 140, a region in which the first pixel light PL1 proceeds may not overlap with a region in which the second pixel light PL2 proceeds.

The optical axis adjusting element 140 may include a beam splitter. Specifically, the optical axis adjusting element 140 may include a polarizing beam splitter configured to transmit or reflect light according to polarization characteristics. For example, the first light source 112 may output first pixel lights PL1 including a first polarization, and the second light source 114 may output second pixel lights PL2 including a second polarization. Further, when the optical axis adjusting element 140 includes a polarizing beam splitter configured to transmit light including the first polarization and reflect light including the second polarization, the optical axis adjusting element 140 may transmit the first pixel light PL1 and reflect the second pixel light PL2 to apply the transmitted first pixel light PL1 and the reflected second pixel light PL2 to the optical scanner 130.

Alternatively, the optical axis adjusting element 140 may include a half mirror configured to transmit some light and reflect some light. Thus, the optical axis adjusting element 140 may apply light transmitted among the first pixel light PL1 and light reflected among the second pixel light PL2 to the optical scanner 130.

Figure 7:
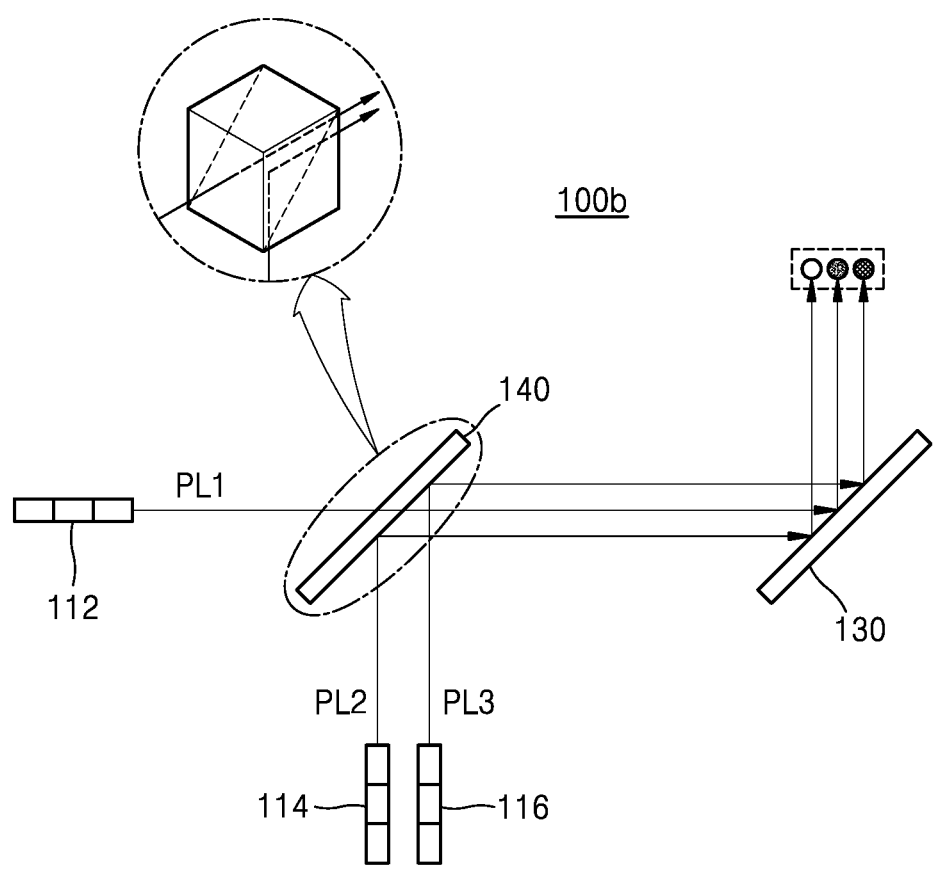
FIG. 7 is a diagram illustrating a display device including three light sources, according to an embodiment.

FIG. 7 is a diagram illustrating a display device 100b including a light source unit 110 including three light sources according to an embodiment. Comparing FIG. 6 with FIG. 7, a light source unit 110 of the display device 100b of FIG. 7 may include a first light source 112, a second light source 114, and a third light source 116. Each of the first light source 112, the second light source 114, and the third light source 116 may emit first pixel light PL1, second pixel light PL2, and third pixel light PL3 in which a different wavelengths of light is mixed in response to a pixel signal. The optical axis adjusting element 140 may transmit the first pixel light PL1 and reflect the second pixel light PL2 and the third pixel light PL3 to apply to the optical scanner 130 the first pixel light PL1, the second pixel light PL2, and the third pixel light PL3 of which optical axes are parallel to one another. The optical axes of the first pixel light PL1, the second pixel light PL2, and the third pixel light PL3 may be parallel to one another, but may not overlap each other.

When the optical scanner 130 is in one position, the first pixel light PL1, the second pixel light PL2, and the third pixel light PL3 may be incident on the optical scanner 130 and reflected. Thus, the optical scanner 130 may output a larger spatial resolution image than when using one light source 200.

Figure 8:
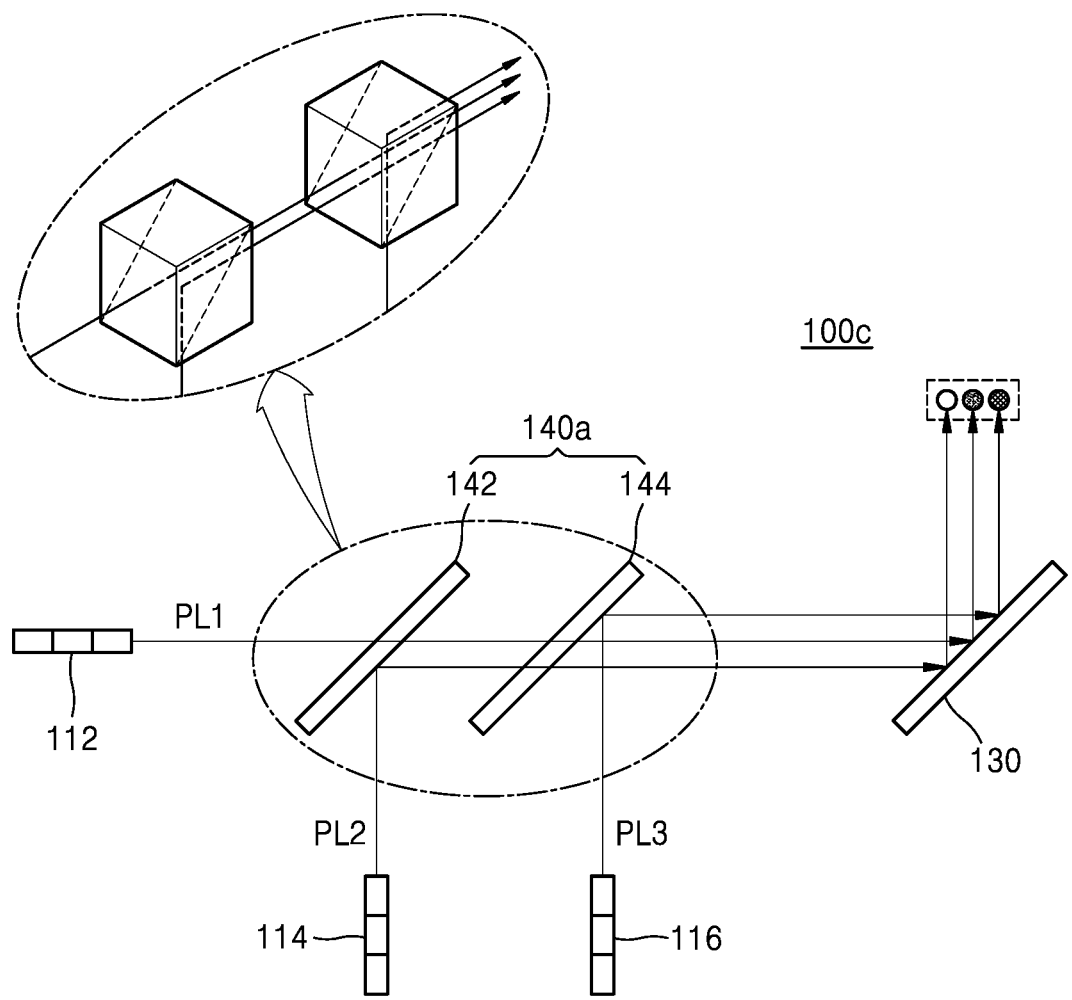
FIG. 8 is a diagram illustrating a display device including three light sources, according to an embodiment.

FIG. 8 is a diagram illustrating a display device 100c including three light sources according to an embodiment. Comparing FIG. 7 with FIG. 8, the display device 100c of FIG. 8 may include a plurality of optical axis adjusting elements 140a. For example, the display device 100c of FIG. 8 may include a first optical axis adjusting element 142 configured to adjust the optical axes of the first pixel light PL1 and the second pixel light PL2 to be parallel to each other, and a second optical axis adjusting element 144 configured to adjust the optical axes of the first pixel light PL1, the second pixel light PL2, and the third pixel light PL3 to be parallel to one another. The first optical axis adjusting element 142 and the second optical axis adjusting element 144 may be a polarizing beam splitter, a half mirror, or the like. For example, the first optical axis adjusting element 142 may be a polarizing beam splitter, and the second optical axis adjusting element 144 may be a half mirror.

Figure 9:
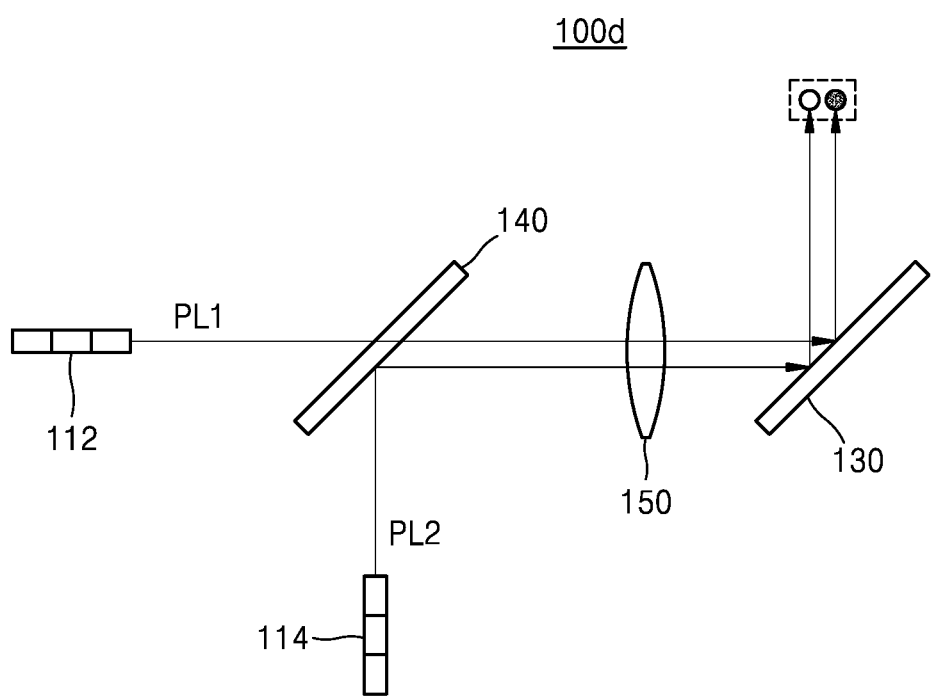
FIG. 9 is a diagram illustrating an example of a display device including an optical axis adjusting element, according to an embodiment.

FIG. 9 is a diagram illustrating an example of a display device 100d including a focus adjusting element 151 according to an embodiment. Comparing FIG. 6 with FIG. 9, the display device 100d of FIG. 9 may further include a focus adjusting element 151 capable of adjusting focal lengths of pixel lights. By adjusting the focal lengths of the pixel light PL1 and the pixel light PL2 according to the user's eyes, the contrast of an image can be improved.

The focus adjusting element 151 may include a lens and a lens driving unit configured to adjust the position of the lens. Alternatively, the focus adjusting element 151 may include a liquid lens configured to change the curvature of a lens surface according to an electrical signal. The liquid lens may include two or more liquid crystal layers that are not mixed with each other, and electrodes configured to control an interface between the liquid crystal layers, that is, the curvature of the lens surface, by applying an electrical signal to the liquid crystal layer.

The display device 100 described above may be a component of a wearable device. For example, the display device 100 may provide a virtual image as a head mounted display (HMD), or may simultaneously provide a virtual image and a real environment. The head mounted display may be a glasses-type display or a goggle-type display.

Figure 10:
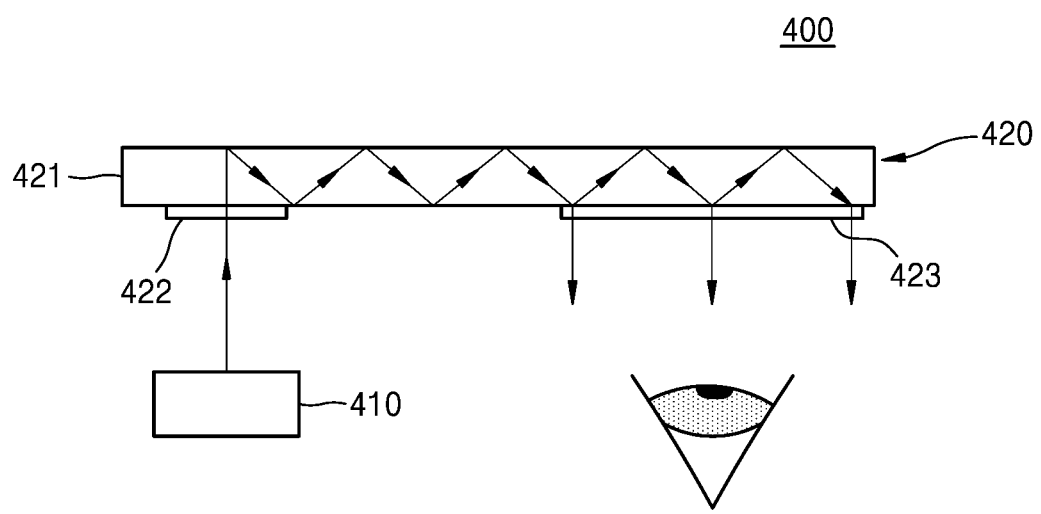
FIG. 10 is a diagram illustrating an example of a head mounted display device configured to provide a virtual image.

FIG. 10 is a diagram illustrating an example of a head mounted display device 400 configured to provide a virtual image. As shown in FIG. 10, the head mounted display device 400 may include a display engine 410 configured to provide a virtual image, and an expander 420 configured to focus a virtual image emitted from the display engine 410 to a user's pupil. The display device 100a, the display device 100b, the display device 100c, and the display device 100d described above may be applied to the display engine 410.

The expander 420 may expand a virtual image output from the display engine 410 in one direction, for example, the x-axis, so that the virtual image is focused on the pupil of the user. The expander 420 may include a waveguide 421, an input coupler 422, and an output coupler 423. Specifically, a virtual image output from the display engine 410 may be incident into the waveguide 421 via the input coupler 422, proceed in the waveguide 421, and output via the output coupler 423 to be focused on the user's pupil. The input coupler 422 and the output coupler 423 may include a diffraction element configured to diffract an image.

Figure 11:
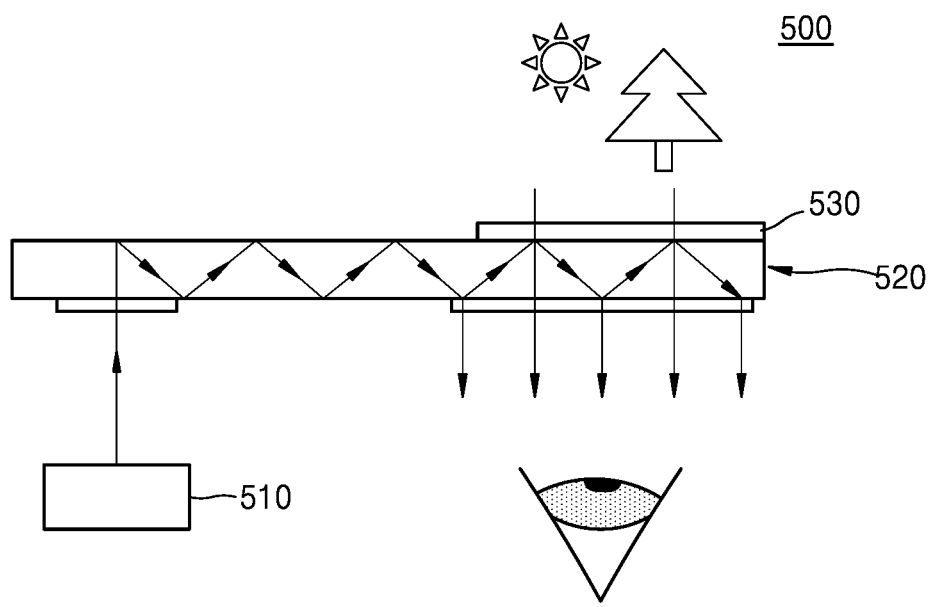
FIG. 11 is a diagram illustrating an example of a head mounted display device configured to provide a virtual image and a real environment, according to an embodiment.

FIG. 11 is a diagram illustrating an example of a head mounted display device 500 configured to provide a virtual image and a reality environment according to an embodiment. Comparing FIG. 10 with FIG. 11, the head mounted display device 500 of FIG. 11 may further include a diffraction element 530 configured to focus light generated in a reality environment to a user's pupil. The diffraction element 530 may be positioned on an expander 520. For example, the diffraction element 530 may be an input coupler that causes light generated in a reality environment to be incident into the waveguide of the expander 520. Thus, the expander 520 may allow not only light output from a display engine 510 but also light corresponding to a reality environment, for example, light reflected from a reality environment or light generated from a reality environment, to be focused on the user's pupil.

Meanwhile, a display device according to an embodiment may be implemented as a single hardware device or a combination of a plurality of hardware devices. For example, the display device may include a slave including a light source unit and an optical scanner, and a master including a processor.

Figure 12:
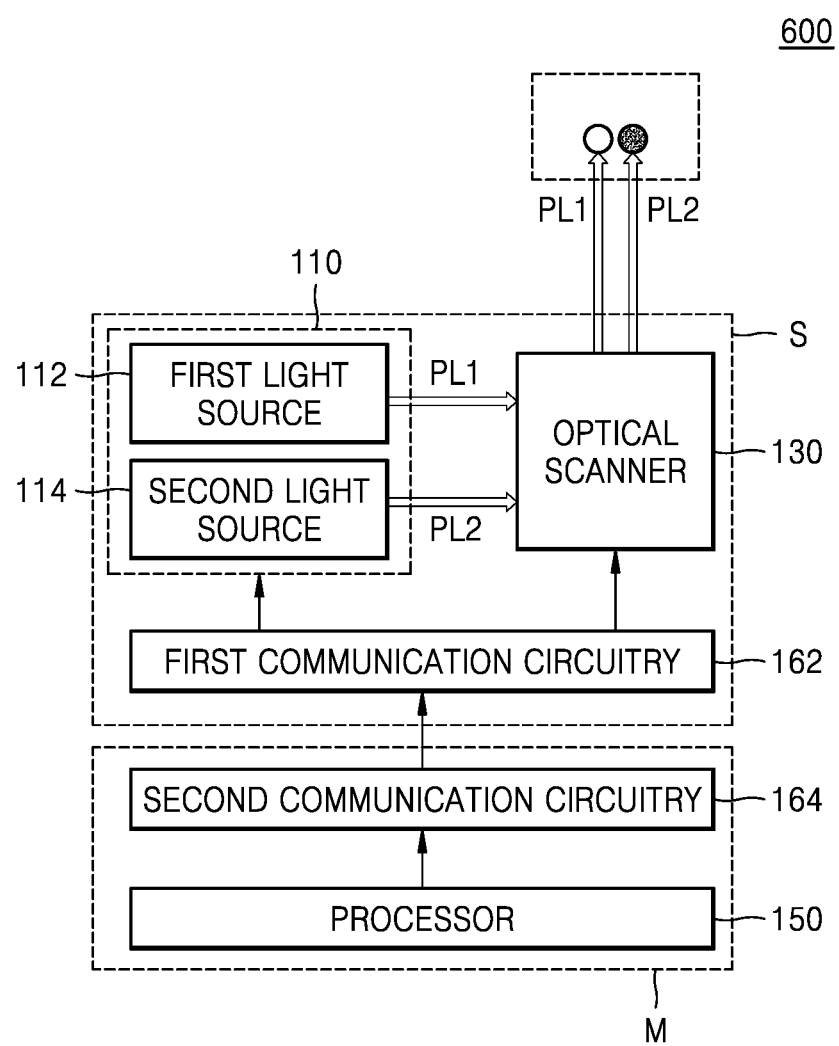
FIG. 12 is a block diagram illustrating a display device according to an embodiment.

FIG. 12 is a block diagram illustrating a display device 600 according to an embodiment. Referring to FIG. 12, the display device 600 may include a slave S including a light source unit 110, an optical scanner 130, and a first communication circuitry 162, and a master M including a second communication circuitry 164 and a processor 150. The light source unit 110 and the optical scanner 130 have been described above, and thus detailed description thereof will be omitted. The slave S may be implemented as a wearable device, for example, a head mounted display device described above, and the master M may be a separate electronic device from the wearable device, such as a mobile phone, a computer, or the like.

The first communication circuitry 162 and the second communication circuitry 164 may provide control commands of the processor 150 to the light source unit 110 and the optical scanner 130. The first communication circuitry 162 and the second communication circuitry 164 may include a short-range wireless communication unit, a mobile communication unit, and the like.

A method of controlling the light source unit 110 and the optical scanner 130 of the processor 150 may be implemented as an S/W program including instructions stored in a computer-readable storage media. The computer is a device capable of invoking stored instructions from a storage medium and operating according to the presented embodiments according to the invoked instructions, and may include a display device 100 according to the presented embodiments.

The computer-readable storage medium may be provided in the form of a non-transitory storage medium. Here, 'non-transitory' means that the storage medium does not contain a signal and is tangible, but does not distinguish between data being stored semi-permanently or temporarily on the storage medium.

In addition, a method of operating the display device 100 according to the presented embodiments may be provided by being included in a computer program product. Computer program products are commodities that can be traded between sellers and buyers.

The computer program product may include an S/W program and a computer-readable storage media in which the S/W program is stored. For example, the computer program product may include a product (e.g., a downloadable app) in the form of an S/W program that is electronically distributed through the manufacturer of the electronic device or an electronic market (e.g., Google Play Store, App Store). For electronic distribution, at least a part of the S/W program may be stored in a storage medium or temporarily generated. In this case, the storage medium may be a server of a manufacturer, a server of an electronic market, or a storage medium of a relay server temporarily storing an S/W program.

The computer program product may include a storage medium of a server or a storage medium of a terminal in a system composed of a server and a terminal (e.g., a vehicle driving control device) or a navigation server). Alternatively, when a third device (e.g., a smart phone) in communication with a server or a terminal exists, the computer program product may include a storage medium of a third device. Alternatively, the computer program product may include an S/W program itself transmitted from the server to the terminal or to the third device, or transmitted from the third device to the terminal.

In this case, one of the server, the terminal, and the third device may execute the computer program product to perform the method according to the presented embodiments. Alternatively, two or more of the server, the terminal, and the third device may execute the computer program product to distribute and perform the method according to the presented embodiments.

For example, a server (e.g., a cloud server, an artificial intelligence server, or the like) may execute a computer program product stored in the server so that a terminal in communication with the server is controlled to perform a method according to the presented embodiments.

As another example, a third device may be controlled to execute a computer program product so that a terminal in communication with the third device performs a method according to the presented embodiment. As a specific example, a third device may be controlled to transmit or receive a packing image by remotely controlling an image transmission device or an image reception device.

When a third device executes a computer program product, the third device may download the computer program product from the server and execute the downloaded computer program product. Alternatively, the third device may execute a computer program product provided in a pre-loaded state to perform a method according to the presented embodiments.

According to embodiments, because mixed light is focused on an external space, the size of a pixel can be reduced.

Because a plurality of light sources are used, a high resolution image can be output.

The above-described display device according to embodiments and the method of operating the same have been described with reference to the embodiments shown in the drawings for ease of understanding, but this is only an example, and it will be understood by those skilled in the art that various modifications and other equivalent embodiments therefrom are possible. Also, embodiments may be combined with each other as appropriate.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display device comprising:
    a first light source configured to emit a plurality of first pixel lights in which a plurality of different wavelengths are mixed;
    a second light source configured to emit a plurality of second pixel lights in which a plurality of different wavelengths are mixed;
    a third light source configured to emit a plurality of third pixel lights in which a plurality of different wavelengths are mixed,
    an optical axis adjusting element configured to transmit the plurality of first pixel lights emitted by the first light source and reflect the plurality of second pixel lights emitted by the second light source and the plurality of third pixel lights emitted by the third light source; and
    an optical scanner configured to output an image including the plurality of first pixel lights, the plurality of second pixel lights and the plurality of third pixel lights to an external space by sequentially changing travelling paths of the plurality of first pixel lights, the plurality of second pixel lights and the plurality of third pixel lights,
    wherein the first light source, the second light source and the third light source are further configured to emit the plurality of first pixel lights, the plurality of second pixel lights and the plurality of third pixel lights sequentially such that a plurality of groups are formed, each of the plurality of groups comprising a first pixel light, a second pixel light corresponding to the first pixel light, and a third pixel light corresponding to the first pixel light that are incident on the optical scanner,
    wherein the plurality of first pixel lights emitted by the first light source pass through the optical axis adjusting element and are transmitted to the optical scanner, and the plurality of second pixel lights emitted by the second light source and the plurality of third pixel lights emitted by the third light source are reflected by the optical axis adjusting element toward the optical scanner, and
    wherein the optical scanner is further configured to perform a scanning in a horizontal direction and focus each of the plurality of groups such that the first pixel light, the second pixel light corresponding to the first pixel light and the third pixel light corresponding to the first pixel light are focused adjacently in the horizontal direction.

2. The display device of claim 1, wherein at least one of the first light source or the second light source comprises:
    a first sub-light source configured to emit first light of a first wavelength;
    a second sub-light source configured to emit second light of a second wavelength;
    a third sub-light source configured to emit third light of a third wavelength; and
    a light mixing element configured to mix the first light, the second light, and the third light respectively emitted from the first sub-light source, the second sub-light source, and the third sub-light source.

3. The display device of claim 2, wherein the light mixing element is further configured to mix the first light, the second light, and the third light by matching optical axes of the first light, the second light, and the third light.

4. The display device of claim 2, wherein the light mixing element comprises at least one of a waveguide, a multiplexer, or a dichroic filter.

5. The display device of claim 2, wherein the first light, the second light, and the third light are red light, green light, and blue light, respectively.

6. The display device of claim 1, wherein the optical scanner is further configured to form images adjacent to each other in the external space by changing-travelling paths of first pixel lights and second pixel lights corresponding to each other among the plurality of first pixel lights and the plurality of second pixel lights.

7. The display device of claim 6, wherein the optical scanner is further configured to form the images such that the first pixel lights and the second pixel lights corresponding to each other do not overlap with each other.

8. The display device of claim 6, wherein the first pixel lights and the second pixel lights corresponding to each other are incident on the optical scanner at adjacent times among the plurality of first pixel lights and the plurality of second pixel lights.

9. The display device of claim 1, wherein the first light source and the second light source are further configured to alternately emit the plurality of first pixel lights and the plurality of second pixel lights one by one.

10. The display device of claim 1, wherein the plurality of first pixel lights and the plurality of second pixel lights have different polarization characteristics.

11. The display device of claim 1, wherein optical axes of the plurality of first pixel lights do not match optical axes of the plurality of second pixel lights.

12. The display device claim 1, wherein the optical axis adjusting element comprises a beam splitter.

13. The display device of claim 12, wherein the beam splitter comprises at least one of a polarizing beam splitter or a half mirror.

14. The display device of claim 1, further comprising:
    a focus adjustment element configured to adjust focal lengths of the plurality of first pixel lights and the plurality of second pixel lights.

15. A display apparatus comprising:
    the display device of claim 1; and
    an expander configured to receive the image from the display device, expand the image, and focus the image on a pupil of a user.

16. The display device of claim 1, wherein the display device is a head mounted display.

17. A method of operating a display device, the method comprising:
    controlling a first light source to emit a plurality of first pixel lights in which a plurality of different wavelengths are mixed, a second light source to emit a plurality of second pixel lights in which a plurality of different wavelengths are mixed and a third light source to emit a plurality of third pixel lights in which a plurality of different wavelengths are mixed;

controlling an optical axis adjusting element to transmit the plurality of first pixel lights emitted by the first light source and reflect the plurality of second pixel lights emitted by the second light source and the plurality of third pixel lights emitted by the third light source; and controlling an optical scanner to output an image including the plurality of first pixel lights, the plurality of second pixel lights and the plurality of third pixel lights by changing travelling paths of the plurality of first pixel lights the plurality of second pixel lights and the plurality of third pixel lights over time, wherein the controlling of the first light source, the second light source, and the third light source comprises controlling the first light source, the second light source, and the third light source to emit the plurality of first pixel lights, the plurality of second pixel lights and the plurality of third pixel lights sequentially such that a plurality of groups are formed, each of the plurality of groups comprising a first pixel light, a second pixel light corresponding to the first pixel light, and a third pixel light corresponding to the first pixel light that are incident on the optical scanner, wherein the plurality of the first pixel lights emitted by the first light source pass through the optical axis adjusting element and are transmitted to the optical scanner, and the plurality of second pixel lights emitted by the second light source and the plurality of third pixel lights emitted by the third light source are reflected by the optical axis adjusting element toward the optical scanner, and wherein the controlling of the optical scanner comprises controlling the optical scanner to perform a scanning in a horizontal direction and focus each of the plurality of groups, such that the first pixel light, the second pixel light corresponding to the first pixel light, and the third pixel light corresponding to the first pixel light are focused adjacently in the horizontal direction.

* * * * *